(12) United States Patent
Kunitake

(10) Patent No.: US 12,340,548 B2
(45) Date of Patent: Jun. 24, 2025

(54) DETECTION SYSTEM FOR DETECTING ENTRANCE OF AIRCRAFT

(71) Applicant: SHINMAYWA INDUSTRIES, LTD., Takarazuka (JP)

(72) Inventor: Takashi Kunitake, Takarazuka (JP)

(73) Assignee: SHINMAYWA INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/562,487

(22) PCT Filed: Jan. 21, 2022

(86) PCT No.: PCT/JP2022/002158
§ 371 (c)(1),
(2) Date: Nov. 20, 2023

(87) PCT Pub. No.: WO2023/007770
PCT Pub. Date: Feb. 2, 2023

(65) Prior Publication Data
US 2024/0249492 A1    Jul. 25, 2024

(30) Foreign Application Priority Data
Jul. 29, 2021 (JP) .................................. 2021-124555

(51) Int. Cl.
*G06V 10/22* (2022.01)
*G06T 3/00* (2006.01)
(Continued)

(52) U.S. Cl.
CPC ................ *G06V 10/22* (2022.01); *G06T 3/00* (2013.01); *G06T 7/70* (2017.01); *G06V 20/52* (2022.01);
(Continued)

(58) Field of Classification Search
None
See application file for complete search history.

(56) References Cited

U.S. PATENT DOCUMENTS

2020/0165009 A1* 5/2020 Sonoda ................... B64F 1/305
2021/0214103 A1* 7/2021 Casado Merino ...... B64F 1/002

FOREIGN PATENT DOCUMENTS

JP           6720414 B2    7/2020
JP        2020175727 A   10/2020
WO  WO-2020030735 A1 *  2/2020 ........... B64C 1/1423

* cited by examiner

*Primary Examiner* — James M Anderson, II
(74) *Attorney, Agent, or Firm* — Alleman Hall & Tuttle LLP

(57) ABSTRACT

A detection system includes: a passenger boarding bridge connected to a terminal building; a camera on the passenger boarding bridge; and an image processor that detects an entrance of an aircraft from a captured image captured by the camera. The image processor includes: a search area image generator that generates a search area image by demarcating a predetermined area including part of the captured image; and a search performer that performs a search to determine whether or not the entrance is present within the search area image. The search area image generator shifts the predetermined area on the captured image from one side toward the other side of the aircraft in a direction of an aircraft axis of the aircraft to sequentially generate the search area image. The search performer repeatedly performs the search while changing the search area image by using multiple search area images that are sequentially generated.

7 Claims, 9 Drawing Sheets

(51) Int. Cl.
    *G06T 7/70*          (2017.01)
    *G06V 20/52*        (2022.01)
    *H04N 23/695*      (2023.01)
    *H04N 23/90*       (2023.01)
    *B64F 1/305*       (2006.01)

(52) U.S. Cl.
    CPC ........... *H04N 23/695* (2023.01); *H04N 23/90* (2023.01); *B64F 1/305* (2013.01); *G06T 2207/30232* (2013.01)

DETECTION SYSTEM FOR DETECTING ENTRANCE OF AIRCRAFT

TECHNICAL FIELD

The present disclosure relates to a detection system for detecting an entrance of an aircraft.

BACKGROUND ART

Conventionally, a passenger boarding bridge is known as equipment that forms a passenger walkway between an aircraft and a terminal building of an airport. The passenger boarding bridge includes: a rotunda connected to the terminal building and supported in a horizontally rotatable manner; an extendable and retractable tunnel unit whose proximal end is connected to the rotunda; a cab rotatably provided at the distal end of the tunnel unit and docked with an entrance of the aircraft; and a drive column provided at the distal side of the tunnel unit, the drive column serving as a support leg. The drive column includes: a lifting/lowering device configured to support the tunnel unit and move the tunnel unit upward/downward; and a travel device provided under the lifting/lowering device, the travel device including a pair of travel wheels. It has been proposed to automatically move such a passenger boarding bridge (see, for example, Patent Literatures 1 and 2 indicated below).

For example, Patent Literature 1 discloses that a camera to capture an image of the entrance of the aircraft is mounted to the cab. When the cab is at a predetermined standby position, horizontal positional information about the entrance is calculated based on the image of the entrance captured by the camera, and based on the calculated horizontal positional information, a destination target position to which the cab is to be moved and at which the cab is to be docked with the entrance is calculated. Then, the cab at the standby position is caused to move toward the target position.

Patent Literature 2 discloses a configuration in which a head part (i.e., the cab) that is connectable to the entrance of the aircraft is provided with two cameras, i.e., first and second cameras. When an input to start driving is performed with an operating panel, traveling by wheels is started by a travel drive unit, and when the head part has reached a position that is several meters away from the aircraft, the first camera and the second camera start capturing images of a first characteristic part and a second characteristic part of the aircraft. Then, by using the images captured by the first and second cameras, the position of a target point on the entrance of the aircraft is calculated, and a relative position and a relative angle of the head part with respect to the entrance of the aircraft are calculated. Based on these, a control correction amount is calculated, and based on the calculated control correction amount, various drive units are driven to move the head part toward the target point on the aircraft.

CITATION LIST

Patent Literature

PTL 1: Japanese Patent No. 6720414
PTL 2: Japanese Laid-Open Patent Application Publication No. 2020-175727

SUMMARY OF INVENTION

Technical Problem

In order to automatically move such a passenger boarding bridge, it is necessary to precisely detect the position of the entrance of the aircraft from a captured image captured by a camera provided on the distal end part of the passenger boarding bridge. In particular, the position of the entrance of the aircraft may significantly vary depending on, for example, the type and size of the aircraft that is parked. Moreover, the gate arrangement at the airport also varies from airport to airport, and it is troublesome to preset an entrance position detection mode for each combination of the parked aircraft and the gate arrangement. Thus, the above Patent Literatures 1 and 2 have a room for improvement in terms of precisely detecting the position of the entrance of each of a plurality of types of aircrafts for various gate arrangements.

The present disclosure has been made to solve the above-described problems. An object of the present disclosure is to provide a detection system that is capable of precisely detecting, for various gate arrangements, the position of an entrance of an aircraft by using a captured image captured by a camera provided on the distal end part of a passenger boarding bridge.

Solution to Problem

A detection system according to one aspect of the present disclosure is a detection system for detecting an entrance of an aircraft, the detection system including: a passenger boarding bridge connected to a terminal building; a camera provided on the passenger boarding bridge; and an image processor that detects the entrance of the aircraft from a captured image captured by the camera. The image processor includes: a search area image generator that generates a search area image by demarcating a predetermined area that includes a part of the captured image; and a search performer that performs a search to determine whether or not the entrance is present within the search area image. The search area image generator shifts the predetermined area on the captured image from one side toward the other side of the aircraft in a direction of an aircraft axis of the aircraft to sequentially generate the search area image. The search performer repeatedly performs the search while changing the search area image by using a plurality of the search area images that are sequentially generated.

According to the above configuration, a plurality of search area images are generated from the captured image captured by the camera provided on the passenger boarding bridge. On each of the plurality of search area images, the predetermined area, which includes a part of the captured image, is demarcated. Each of the plurality of search area images is generated by shifting the predetermined area from one side toward the other side of the aircraft in the direction of the aircraft axis. Accordingly, the search for the entrance is repeatedly performed while changing the search area image by using the plurality of search area images, which are sequentially generated. In this manner, the search for the entrance can be performed over the entire captured image while shifting the search area in a direction along the aircraft axis of the aircraft. This makes it possible to perform the search for the entrance in a uniform manner regardless of the type of the aircraft or the gate arrangement. This makes precise detection of the position of the entrance of the aircraft possible for various gate arrangements.

The search area image generator may perform projective transformation on a virtual plane in the captured image, the virtual plane being perpendicular to a horizontal plane and parallel to the aircraft axis, to transform the virtual plane into an image that is seen from a direction perpendicular to the virtual plane.

According to the above configuration, the search area image is generated as an image parallel to the aircraft axis. Therefore, even in a case where the captured image is an image captured from a diagonal direction relative to the aircraft, shape distortion of the entrance to be searched for can be suppressed in the search area image. This makes it possible to improve the precision of the search for the entrance in the search area image.

Each time the search area image generator demarcates the predetermined area, which includes a part of the captured image, the search area image generator may perform the projective transformation on the captured image in the predetermined area.

According to the above configuration, for each predetermined area, the projective transformation is performed on the captured image. In this manner, a reduction in image resolution can be suppressed compared to a case where: the projective transformation is performed on the entire captured image; and then from the resulting projective-transformed image, the predetermined area is demarcated.

The detection system may include: an image-capturing direction changing mechanism that changes an image-capturing direction of the camera by rotating about a predetermined rotational axis that extends in a direction crossing the horizontal plane; and a controller that controls an operation of the image-capturing direction changing mechanism. The image processor may include a search range determiner that determines whether or not the predetermined area that has been shifted is within a predefined search range and within the captured image. In a case where it is determined that the predetermined area that has been shifted is within the search range, but is not within the captured image, the controller may cause the image-capturing direction changing mechanism to change the image-capturing direction of the camera, and cause the camera to capture an image again.

According to the above configuration, by performing the image capturing multiple times while changing the image-capturing direction of the camera, a captured image of the entire search range can be obtained as a plurality of captured images. Accordingly, an image-capturing range for each time of image capturing can be made relatively narrow, which makes it possible to increase the resolution of the search area image obtained from the captured image, or makes it possible to set the search range to be wider than the field of view of the camera.

The passenger boarding bridge may include a first boarding bridge and a second boarding bridge. The camera may include a first camera provided on the first boarding bridge and a second camera provided on the second boarding bridge. The search area image generator may shift the predetermined area on the captured image captured by the first camera from a front side toward a back side of the aircraft in the direction of the aircraft axis to sequentially generate the search area image, and may shift the predetermined area on the captured image captured by the second camera from the back side toward the front side of the aircraft in the direction of the aircraft axis to sequentially generate the search area image.

According to the above configuration, based on the captured image captured by the first camera provided on the first boarding bridge, the entrance of the aircraft to which the first boarding bridge is to be connected is searched for, and based on the captured image captured by the second camera provided on the second boarding bridge, the entrance of the aircraft to which the second boarding bridge is to be connected is searched for. At the time, in the search for the entrance with use of the captured image captured by the first camera, the search is performed from the front side toward the back side of the aircraft in the direction of the aircraft axis, whereas in the search for the entrance with use of the captured image captured by the second camera, the search is performed from the back side toward the front side of the aircraft in the direction of the aircraft axis. In this manner, based on the captured image captured by the first camera, the entrance that is positioned on the front side of the aircraft can be detected preferentially, and based on the captured image captured by the second camera, the entrance that is positioned on the back side of the aircraft can be detected preferentially. Therefore, the entrance to which the first boarding bridge is to be connected, and the entrance to which the second boarding bridge is to be connected, can be precisely searched out within a short period of time.

The search performed by the search performer may include a first search and a second search, and the search performer may perform the first search and the second search in parallel, the first search using the search area image that is generated from the captured image captured by the first camera, the second search using the search area image that is generated from the captured image captured by the second camera. According to the above configuration, the search for the entrance to which the first boarding bridge is to be connected, and the search for the entrance to which the second boarding bridge is to be connected, are concurrently performed in parallel, which makes it possible to shorten the search period.

In a case where a distance between a first position and a second position, the first position being a position at which the entrance is detected by the first search using the search area image generated from the captured image captured by the first camera, the second position being a position at which the entrance is detected by the second search using the search area image generated from the captured image captured by the second camera, is less than a predetermined reference value, if both the first position and the second position are included in at least one of a first search range set for the first camera or a second search range set for the second camera, the search performer may determine that the entrance has been detected at the first position or the second position.

According to the above configuration, in a case where the distance between the position of the entrance detected by the first search (the first position) and the position of the entrance detected by the second search (the second position) is short, if both the first position and the second position are included in at least one of the first search range or the second search range, then it is determined that one entrance has been detected by the two searches. Thus, even in a case where the first position and the second position are close to each other, only in a case where the detection of one entrance by two searches is assumed to be reliable, a determination that one entrance has been detected is made, which makes it possible to suppress the occurrence of erroneous detection.

Advantageous Effects of Invention

The present disclosure makes it possible to precisely detect, for various gate arrangements, the position of an entrance of an aircraft by using a captured image captured by a camera provided on the distal end part of a passenger boarding bridge.

DESCRIPTION OF EMBODIMENTS

Figure 1:
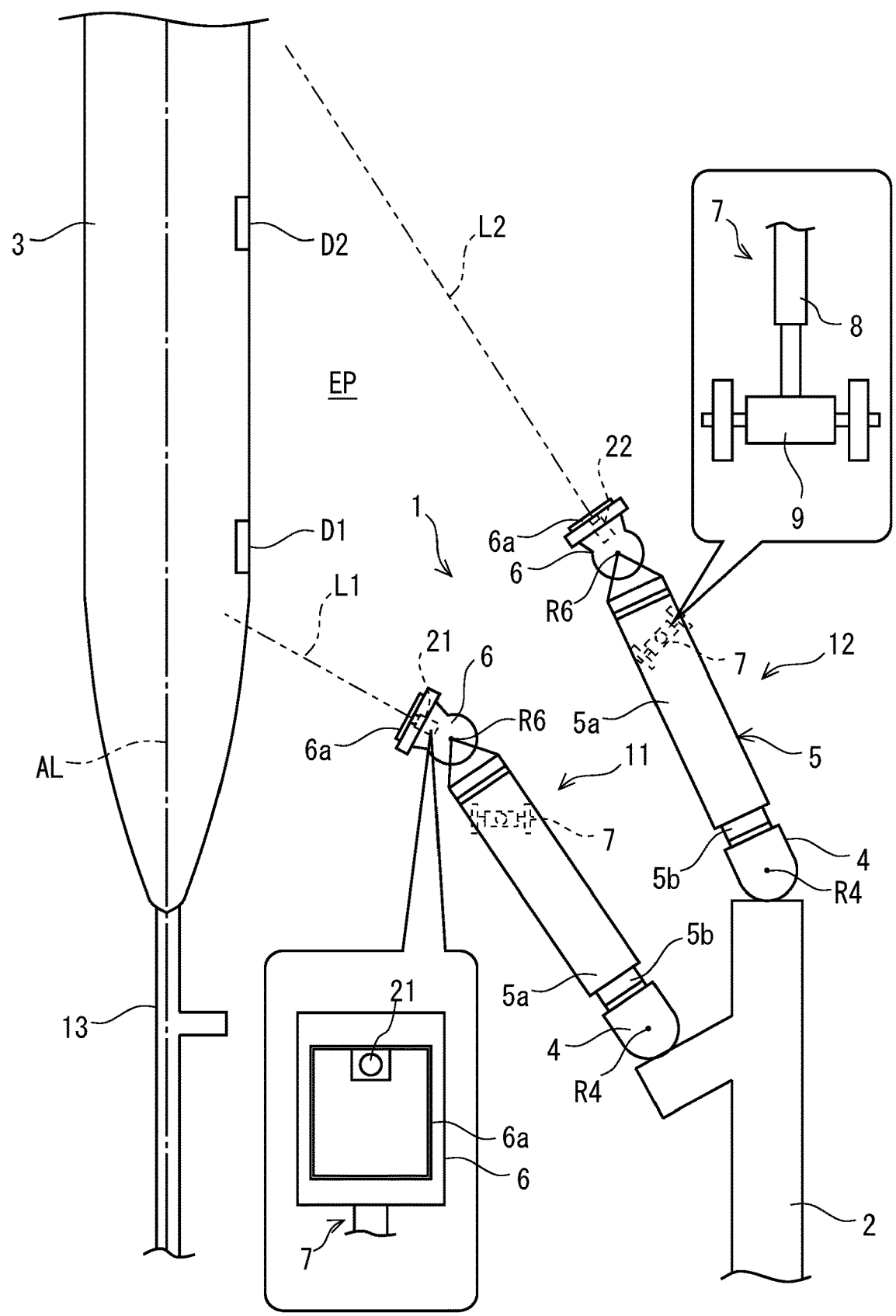
FIG. 1 is a schematic plan view showing one example of a passenger boarding bridge to which a detection system according to an embodiment of the present invention is applied.

Hereinafter, a preferred embodiment of the present disclosure is described with reference to the drawings. In the drawings, the same or corresponding elements are denoted by the same reference signs, and repeating the same descriptions is avoided below. The drawings show each component schematically in order to facilitate the understanding thereof. Therefore, in some cases, the drawings may not display accurate shapes, accurate dimensional ratios, etc. The present disclosure is not limited to the embodiment described below.

FIG. 1 is a schematic plan view showing one example of a passenger boarding bridge to which a detection system according to the present embodiment is applied. In the example of FIG. 1, a passenger boarding bridge 1 includes a first boarding bridge 11 and a second boarding bridge 12. Each of the boarding bridges 11 and 12 has the same configuration.

Each of the boarding bridges 11 and 12 includes: a rotunda (a proximal-end round room) 4 connected to an entrance of a terminal building 2 of an airport; a tunnel unit 5, whose proximal end is connected to the rotunda 4 in such a manner that the tunnel unit 5 is liftable and lowerable, the tunnel unit 5 being configured to be extendable and retractable in the longitudinal direction of the tunnel unit 5; and a cab (a distal-end round room) 6 connected to the distal end part of the tunnel unit 5. The rotunda 4 is configured to be horizontally rotatable about a first rotational axis R4, which extends in the vertical direction. The cab 6 is configured to be horizontally rotatable about a second rotational axis R6, which extends in a direction orthogonal to the bottom surface of the cab 6.

The tunnel unit 5 forms a passenger walkway, and includes a plurality of tubular tunnels 5a and 5b, which are fitted together in a nested manner, such that the tunnel unit 5 is extendable and retractable in the longitudinal direction thereof. In the description herein, the tunnel unit 5 is formed by the two tunnels 5a and 5b as one example. The tunnel unit 5 is formed by at least two tunnels. The proximal end part of the tunnel unit 5 is connected to the rotunda 4 in such a manner that the proximal end part is swingable (vertically) about a rotational axis that extends in the horizontal direction. That is, the proximal end part of the tunnel unit 5 is connected to the rotunda 4 in such a manner that the tunnel unit 5 is liftable and lowerable.

The distal end part of the tunnel unit 5 (specifically, the tunnel 5a on the distal end side of the tunnel unit 5) is provided with a drive column 7, which serves as a support leg. It should be noted that the drive column 7 may be mounted to the cab 6. The drive column 7 includes a lifting/lowering device 8, which lifts and lowers the cab 6 and the tunnel unit 5. Accordingly, the cab 6 and the tunnel unit 5 can be swung vertically with respect to the rotunda 4. Therefore, the orientation of the second rotational axis R6, which is the rotational axis of the cab 6, changes in accordance with an inclination of the bottom surface of the cab 6 relative to a horizontal plane. In other words, the second rotational axis R6 extends in a direction crossing the horizontal plane, and the extending direction of the second rotational axis R6 changes in accordance with vertical swinging of the cab 6 and the tunnel unit 5.

The drive column 7 includes a travel device 9, which causes the tunnel unit 5 to rotate about the rotunda 4 (i.e., about the first rotational axis R4) and also causes the tunnel unit 5 to extend/retract. The travel device 9 is provided under the lifting/lowering device 8. The travel device 9 includes, for example, two travel wheels, each of which can be independently driven to rotate in regular and reverse directions. By causing the two travel wheels to rotate in the same direction (regular rotation or reverse rotation), the travel device 9 can travel forward or backward. Also, by causing the two travel wheels to rotate in opposite directions to each other, the travel direction (the facing direction of the travel wheels) can be changed on the spot. It should be noted that the present embodiment illustratively describes the configuration in which the tunnel unit 5 rotates about the first rotational axis R4 as a result of the rotunda 4 rotating about the first rotational axis R4. However, as an alternative, the rotunda 4 may be fixed to the terminal building 2, and the tunnel unit 5 may be connected to the rotunda 4 in such a manner that the tunnel unit 5 is rotatable about the first rotational axis R4.

The distal end part of the cab 6 includes a connector 6a to be connected to an entrance D1 or D2 of an aircraft 3. The connector 6a includes components such as a closure, a bumper, and a distance sensor. By rotating of the cab 6 about the second rotational axis R6, the position of the connector 6a (the direction in which the connector 6a is to be connected to the entrance D1 or D2) can be changed. It should be noted that instead of rotating the cab 6, the connector 6a may be rotated about the second rotational axis R6 relative to the cab 6.

Cameras 21 and 22 are installed on the respective cabs 6. Each of the cameras 21 and 22 is a camera to capture an image of a side surface of the aircraft 3. Each of the cameras 21 and 22 is provided on the distal end part of a corresponding one of the cabs 6. In the example of FIG. 1, the first boarding bridge 11 is provided with the first camera 21, which is installed on the upper inner side of the connector 6a of the cab 6. The second boarding bridge 12 is provided with the second camera 22, which is installed in the same manner as the first camera 21. It should be noted that each of the cameras 21 and 22 may be installed at any position on the distal end part of the cab 6, so long as the cameras 21 and 22 can each capture an image of the side surface of the aircraft 3. For example, each of the cameras 21 and 22 may be installed on the lower inner side of the connector 6a of the cab 6, or installed on the upper outer side or the lower outer side of the cab 6. Further, a plurality of cameras may be installed on one of the boarding bridges 11 and 12. For example, the cameras may be installed on the upper and lower parts of the cab 6, respectively.

In the present embodiment, based on a captured image G1 captured by the first camera 21 provided on the distal end part of the first boarding bridge 11, the entrance D1 of the aircraft 3, to which the first boarding bridge 11 is to be connected, is searched for, and based on a captured image G2 captured by the second camera 22 provided on the distal end part of the second boarding bridge 12, the entrance D2 of the aircraft 3, to which the second boarding bridge 12 is to be connected, is searched for.

Figure 2:
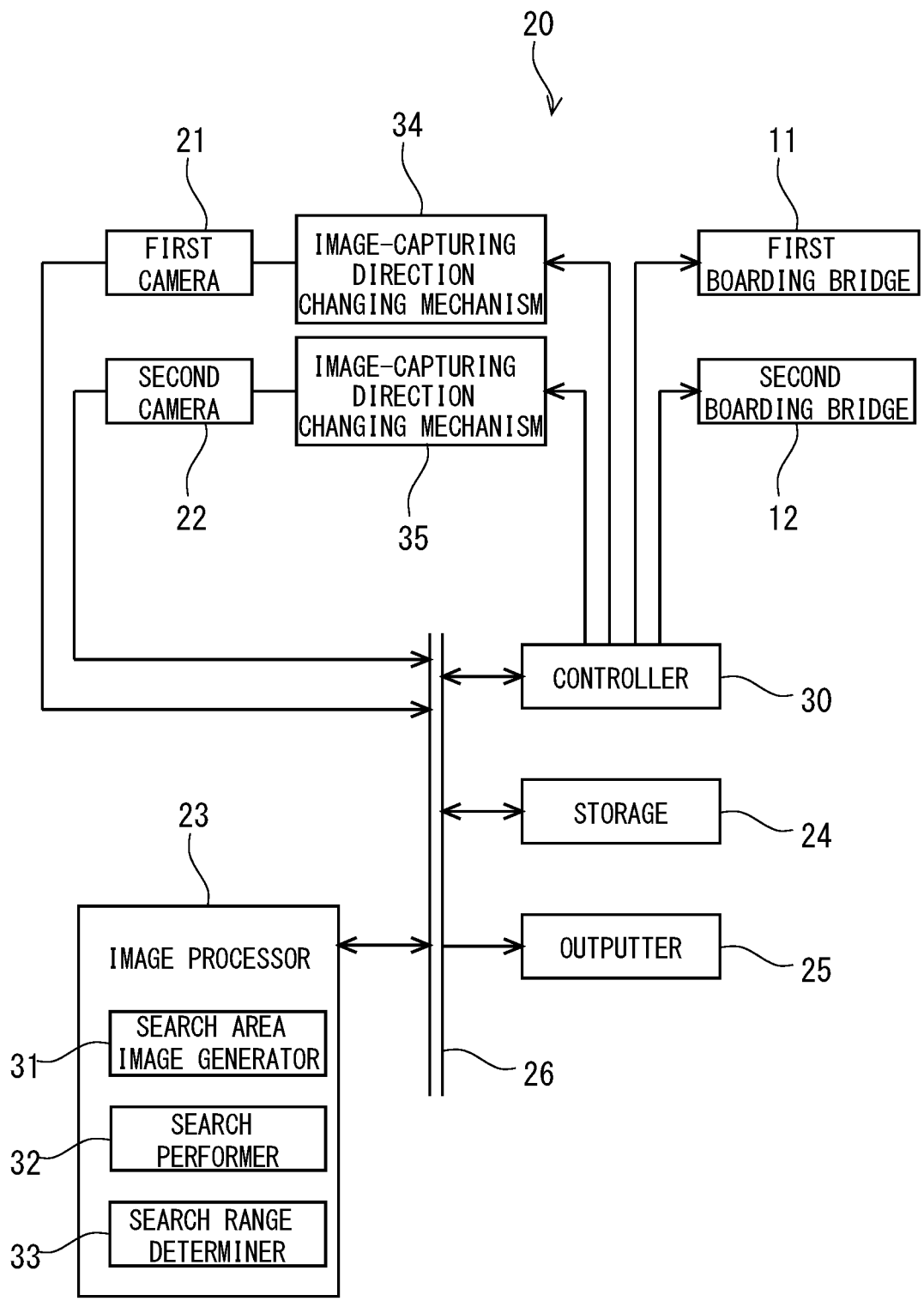
FIG. 2 is a block diagram showing a schematic configuration of the detection system that is applied to the passenger boarding bridge shown in FIG. 1.

FIG. 2 is a block diagram showing a schematic configuration of the detection system that is applied to the passenger boarding bridge shown in FIG. 1. As shown in FIG. 2, a detection system 20 in the present embodiment includes the aforementioned cameras 21 and 22 and an image processor 23. The image processor 23 detects the entrances D1 and D2 of the aircraft 3 from captured images Gj (j=1, 2) captured by the respective cameras 21 and 22. The detection system 20 further includes a storage 24 and an outputter 25. The storage 24 stores data of, for example, the captured images, an image processing program, and so forth. The outputter 25 outputs, for example, detection results. These components 21, 22, 23, 24, and 25 can transmit and receive data to and from each other via a communication bus 26.

A controller 30, which controls the boarding bridges 11 and 12, is also connected to the communication bus 26. The controller 30 is, for example, provided in the cab 6 or in frontmost tunnel 5a. The controller 30 controls rotation of the cab 6 as well as lifting/lowering and traveling of the drive column 7 for each of the boarding bridges 11 and 12. The controller 30 further controls rotation of image-capturing direction changing mechanisms 34 and 35 for the respective cameras 21 and 22.

The image-capturing directions of the respective cameras 21 and 22 (i.e., the orientations of respective image-capturing center axes L1 and L2) are each changeable within a horizontal plane. Accordingly, the detection system 20 includes the image-capturing direction changing mechanisms 34 and 35, each of which changes the image-capturing direction of a corresponding one of the cameras 21 and 22 by rotating about a predetermined rotational axis extending in a direction crossing the horizontal plane. The image-capturing direction changing mechanisms 34 and 35 can change the image-capturing directions of the first and second cameras 21 and 22, respectively, and independently of each other.

The image-capturing direction changing mechanisms 34 and 35 may be configured as camera rotating mechanisms that rotate the cameras 21 and 22 relative to the respective cabs 6. Alternatively, the cabs 6 may serve as the image-capturing direction changing mechanisms 34 and 35, respectively. For example, the cameras 21 and 22 may be fixed to the respective cabs 6, and the image-capturing directions of the respective cameras 21 and 22 (i.e., the orientations of the respective image-capturing center axes L1 and L2) may be changed as a result of the cabs 6 rotating about the respective second rotational axes R6, each of which extends in a direction crossing the horizontal plane.

The controller 30 and the image processor 23 are realized by a computer that performs various calculations and processing based on the data stored in the storage 24. For example, the controller 30 and the image processor 23 include a CPU, a main memory (RAM), a communication interface, etc. It should be noted that the controller 30 and the image processor 23 may be realized by the same computer, or may be realized by different computers, respectively.

The outputter 25 outputs, for example, results of calculations or processing by the controller 30 or the image processor 23. The outputter 25 is configured, for example, as a monitor that displays calculation results and so forth or as a communication device that transmits data to a server or to a communication terminal via a communication network. It should be noted that the image processor 23 and the storage 24 of the detection system 20 may be configured as a server that is connected to the cameras 21 and 22 via a communication network. Specifically, the server may: obtain captured images captured by the respective cameras 21 and 22; perform a below-described search process on the server; and display results thereof on a monitor provided in, for example, a control room of each of the boarding bridges 11 and 12, or on a display of a communication terminal.

The controller 30 and the image processor 23 use, for example, a predetermined three-dimensional coordinate system such as an XYZ orthogonal coordinate system to recognize in real time the position coordinates of parts of the boarding bridges 11 and 12. For example, as absolute coordinates, the intersection point of the first rotational axis R4 of the rotunda 4 and the plane of an apron EP is set as an origin (0, 0, 0), and the position coordinates of each part of the passenger boarding bridge 1 are expressed as position coordinates in a three-dimensional coordinate system in which an X-axis, a Y-axis, and a Z-axis that are orthogonal to each other are set with respect to the origin. Of the position coordinates, an X coordinate value, a Y coordinate value, and a Z coordinate value each indicate a distance (e.g., in units of [mm]) from the origin (0, 0, 0), which is the position of the first rotational axis R4 of the rotunda 4. The controller 30 and the image processor 23 express the positions of parts of the aircraft 3 and parts of the boarding bridges 11 and 12 as position coordinates by using such a three-dimensional orthogonal coordinate system.

The image processor 23 includes the following function blocks to perform the below-described search process: a search area image generator 31; a search performer 32; and a search range determiner 33. Part of, or the entirety of, these function blocks include circuitry including integrated circuitry. Therefore, these components 31, 32, and 33 can be considered as circuitry. These function blocks are hardware that carry out or are programmed to perform the recited functionality. The hardware may be any hardware disclosed herein or otherwise known which is programmed or configured to carry out the recited functionality. When the hardware is a processor which may be considered a type of circuitry, these function blocks are a combination of hardware and software, the software being used to configure the hardware and/or processor. The image processor 23 reads out, from the storage 24, a program for performing a search process to perform the search process, which will be described below.

Figure 3:
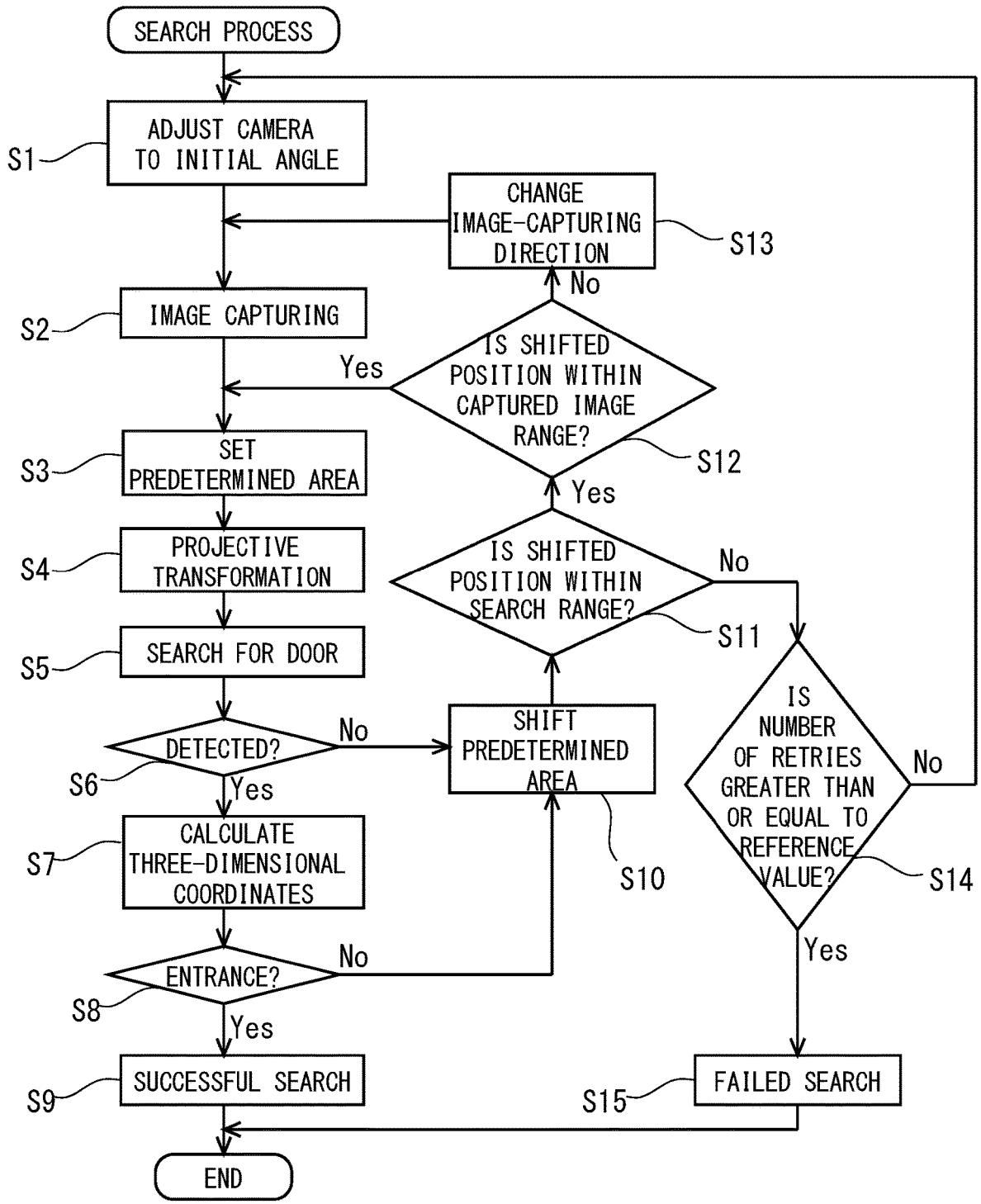
FIG. 3 is a flowchart showing a flow of a search process in the present embodiment.

Hereinafter, the search process to search for the entrance D1, D2 in the present embodiment is described. FIG. 3 is a flowchart showing a flow of the search process in the present embodiment. The search process is performed in a case where the aircraft 3 has arrived at a predetermined arrival position. Accordingly, each of the boarding bridges 11 and 12 is, as shown in FIG. 1, at an initial position (standby position) to avoid the aircraft 3.

The storage 24 stores data of search ranges that are preset for the respective cameras 21 and 22. Each search range is set as an area extending along the direction of an aircraft axis AL. The storage 24 further stores initial angles of the respective cameras 21 and 22 (i.e., data of the image-capturing directions). The initial angles of the respective cameras 21 and 22 are, when the boarding bridges 11 and 12 are at their initial positions, set to such angles that the angle of view of each of the cameras 21 and 22 includes at least one end portion of the search range, which is preset for each of the cameras 21 and 22 in the direction of the aircraft axis AL.

As described below, in a first search using a captured image captured by the first camera 21, the search is performed from the front side toward the back side of the aircraft 3 in the direction of the aircraft axis AL. Accordingly, the initial angle of the first camera 21 is, when the first boarding bridge 11 is at its initial position, set to such an angle that the angle of view of the first camera 21 includes the front end portion of the search range set for the first camera 21 in the direction of the aircraft axis AL. On the other hand, in a second search using a captured image captured by the second camera 22, the search may be performed from the back side toward the front side of the aircraft 3 in the direction of the aircraft axis AL. In this case, the initial angle of the second camera 22 is, when the second boarding bridge 12 is at its initial position, set to such an angle that the angle of view of the second camera 22 includes the back end portion of the search range set for the second camera 22 in the direction of the aircraft axis AL.

The description below of the search process mainly describes the first search using the first camera 21. The second search using the second camera 22 is the same as the first search using the first camera 21, except that the search direction is different. In the search process, first, the controller 30 controls the image-capturing direction changing mechanism 34 to adjust the angle of the first camera 21 to the initial angle (step S1). The first camera 21 performs image capturing at the initial angle (step S2). The image processor 23 obtains a captured image G1 captured by the first camera 21 at the initial angle. The obtained captured image G1 is stored in the storage 24. It should be noted that the image processor 23 may perform, in advance, predetermined image processing on the captured image G1, such as distortion correction that may be necessary due to the camera lens or brightness correction. A position on the captured image G1 is expressed as position coordinates in a two-dimensional coordinate system in which one vertex of the captured image G1 (e.g., the upper-left vertex) is set as an origin and a U-axis and a V-axis that are orthogonal to each other are set with respect to the origin.

The search area image generator 31 generates a search area image by demarcating a predetermined area Ei (i=1, 2, 3, . . . ), which includes a part of the captured image G1. In order to do this, first, the search area image generator 31 sets, on the captured image G1, the predetermined area Ei corresponding to a virtual rectangular frame Bi in a three-dimensional space that is an actual space (step S3). An area including a front end portion of the search range in the direction of the aircraft axis AL is set as an initial predetermined area E1 in the first search.

Figure 4:
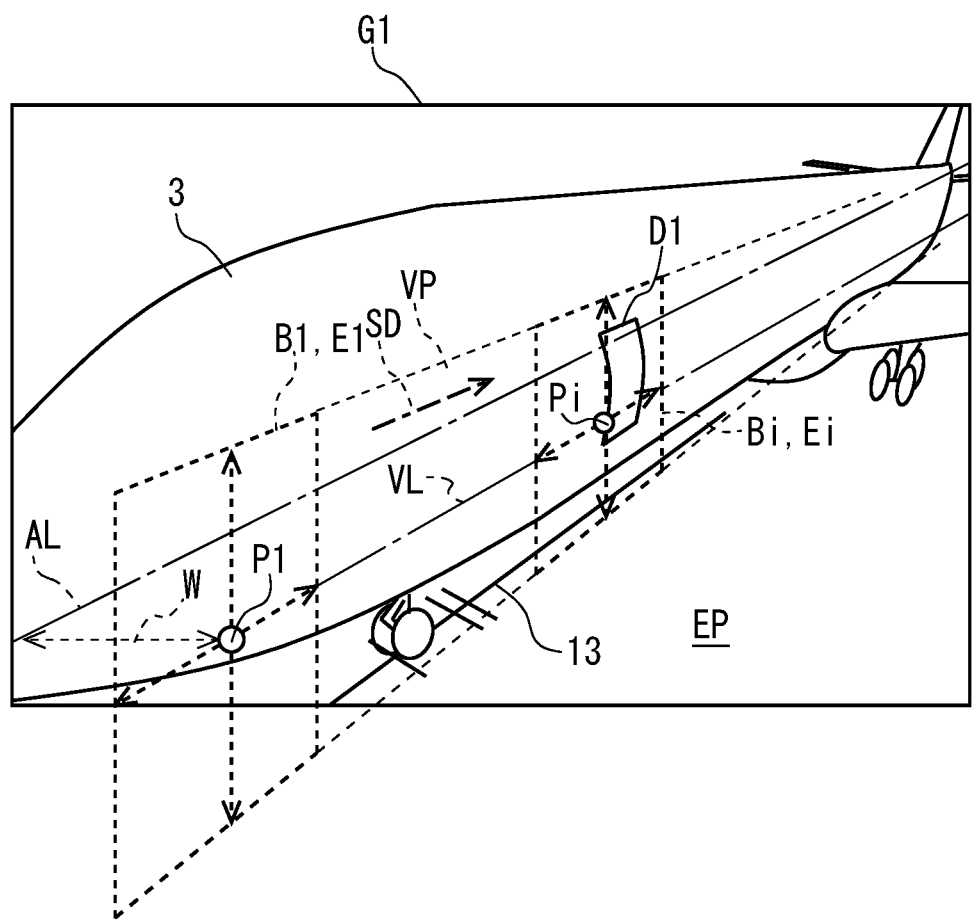
FIG. 4 shows an example of a captured image in the present embodiment.
Figure 5:
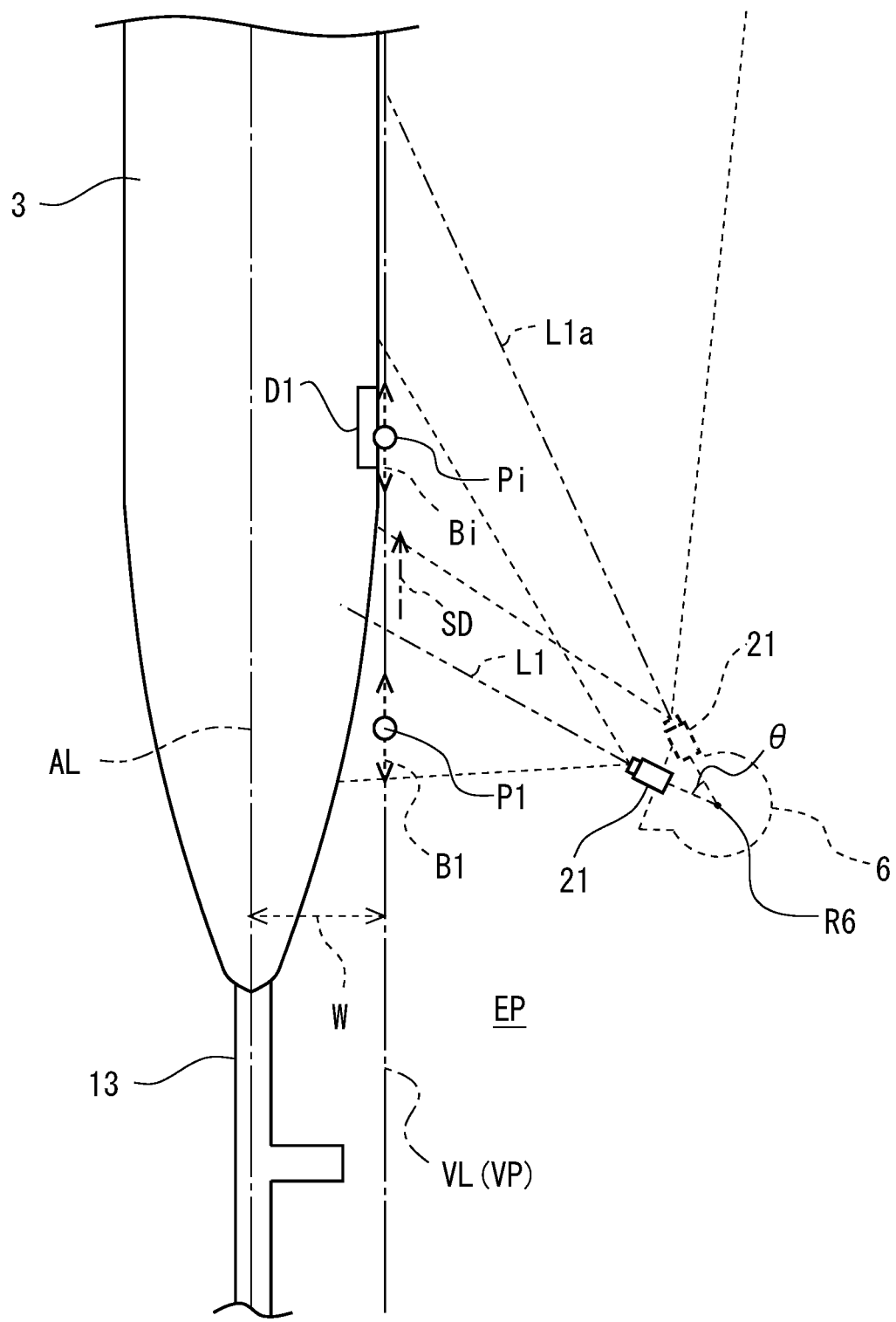
FIG. 5 is a conceptual diagram for setting a predetermined area on the captured image shown in FIG. 4.

FIG. 4 shows an example of a captured image in the present embodiment. FIG. 5 is a conceptual diagram for setting a predetermined area on the captured image shown in FIG. 4. In the present embodiment, the search area image generator 31 sets, on the captured image G1, a virtual plane VP perpendicular to a horizontal plane (apron EL) and parallel to the aircraft axis AL. Here, the aircraft axis AL is preset at a position that is a predetermined distance above a marshall line 13 drawn on the apron EL, assuming that the aircraft 3 is to be parked on the marshall line 13. It should be noted that, in the present specification and the claims, the front side and the back side in the direction of the aircraft axis AL mean the front side and the back side of the aircraft 3 parked on the marshall line 13.

The virtual plane VP is set at a position that is offset from the aircraft axis AL toward one side in the fuselage width direction (specifically, toward one side closer to the boarding bridges 11 and 12) by an offset amount W. That is, the virtual plane VP is defined as a plane including a reference axis VL, which is offset from the aircraft axis AL toward the one side in the fuselage width direction by the offset amount W, the plane being perpendicular to the horizontal plane. The offset amount W is preset in consideration of the fuselage width of the aircraft 3, such that the distance between the virtual plane VP and the outer surface of the entrance D1 or D2 is small (less than a predetermined distance).

The search area image generator 31 sets the virtual rectangular frame Bi in the three-dimensional space on the virtual plane VP. For example, the virtual rectangular frame Bi may be configured as a square frame on the virtual plane VP. The center of the square frame is a reference point Pi on the reference axis VL, and each side of the square frame has a length of 4 m. In many cases, the image-capturing direction of the first camera 21 (i.e., the image-capturing center axis L1) is not perpendicular to the virtual plane VP. Therefore, it is often the case that the virtual rectangular frame Bi is, on the captured image G1, in a distorted quadrangular shape as shown in the predetermined area Ei of FIG. 4. Three-dimensional coordinates Bi (xi, yi, zi) in the actual space have one-to-one correspondence with two-dimensional coordinates Ei (ui, vi) on the captured image G1 captured by the first camera 21. Conversion between the three-dimensional coordinate system in the actual space and the two-dimensional coordinate system on the captured image G1 is performed by perspective projective transformation.

It should be noted that, desirably, the quadrangular shape Ei on the captured image G1, which corresponds to the virtual rectangular frame Bi, is entirely shown on the captured image G1. However, it will suffice so long as at least a part of the quadrangular shape is shown on the captured image G1.

The search area image generator 31 performs projective transformation on the virtual plane VP in the predetermined area Ei set in the above-described manner (i.e., in the area including a part of the captured image G1) to transform the virtual plane VP into an image that is seen from a direction perpendicular to the virtual plane VP (step S4). Here, the pixels out of the range of the captured image G1 are subjected to extrapolation processing, for example, filling the pixels out of the range with black or copying the pixels of edge portions. The projective transformation will be described below.

The search area image generator 31 generates an image on which the projective transformation has been performed, i.e., a projective-transformed image, as a search area image Ci. The generated search area image Ci is enlarged such that the entire virtual rectangular frame Bi is shown as large as possible in the search area image Ci. The search performer 32 performs a search to determine whether or not a door that is potentially the entrance D1 is present within the search area image Ci (step S5). A method adopted to search for the door is not particularly limited, so long as the adopted method is an image recognition process by which the door is detectable. For example, an AI image recognition using a learned model generated by deep learning can be used.

In the door image recognition process, the door and a reference point on the door are detected based on, for example, a contour-painted portion of the door and the shape of a reinforcing plate provided on the door sill. The reference point on the door is set, for example, on a middle portion of the door sill or on a middle portion of the reinforcing plate.

In a case where the search performer 32 detects the door (Yes in step S6), the search performer 32 calculates three-dimensional coordinates of the reference point on the door (step S7). The three-dimensional coordinates of the door are obtained, for example, by converting two-dimensional coordinates on a search area image C1 into two-dimensional coordinates on the original captured image G1 and then converting the two-dimensional coordinates on the captured image G1 into three-dimensional coordinates in the actual space. The conversion of the two-dimensional coordinates into the three-dimensional coordinates in the actual space is performed, for example, by calculations using two-dimensional coordinates of the cameras or by calculations approximating the reference point on the door to be on the virtual plane VP.

Based on the three-dimensional coordinates of the detected door, the search performer 32 determines whether or not the detected door is the entrance D1, with which the first boarding bridge 11 is to be docked (step S8). The storage 24 prestores a search range that includes all of various aircraft doors with which the first boarding bridge 11 is to be docked. In a case where the three-dimensional coordinates of the detected door are within the search range stored in the storage 24, the search performer 32 determines that the entrance D1 has been detected. In a case where it is determined that the entrance D1 has been detected (Yes in step S8), the search performer 32 outputs a result indicative of successful search (step S9).

In a case where the door has not been detected in the search area image Ci (No in step S6) and in a case where it is determined that the detected door is not the entrance D1 (No in step S8), the search area image generator 31 shifts the predetermined area Ei from one side toward the other side of the aircraft 3 in the direction of the aircraft axis AL to sequentially generate the search area image Ci. In the first search intended for the first boarding bridge 11, the search area image generator 31 shifts the predetermined area Ei from the front side toward the back side in the direction of the aircraft axis AL.

In order to do this, first, the search area image generator 31 shifts the virtual rectangular frame Bi in the three-dimensional space from one side toward the other side of the aircraft 3 in the direction of the aircraft axis AL by a predetermined distance. The search area image generator 31 calculates the predetermined area Ei, on the captured image G1, corresponding to the virtual rectangular frame Bi that has been shifted. In this manner, the search area image generator 31 shifts, on the captured image G1, the predetermined area Ei from the one side toward the other side of the aircraft 3 in the direction of the aircraft axis AL (step S10). For example, in the three-dimensional space, on the reference axis VL, a reference point $P_{i+1}$ is set at a position that is a predetermined distance away from the position of the reference point Pi toward the back side in the direction of the aircraft axis AL, and a virtual rectangular frame $B_{i+1}$ is set with reference to the reference point $P_{i+1}$. The distance between the reference point Pi and the reference point $P_{i+1}$ is preferably not greater than the length of one horizontal side of the virtual rectangular frame Bi, and more preferably, not less than ¼ and not greater than ½ of the length of the one horizontal side of the virtual rectangular frame Bi. In this manner, in the door search process, the same door can be detected multiple times (about two or three times).

The search range determiner 33 determines whether or not the predetermined area Ei that has been shifted is within a predefined search range, i.e., whether not the search has been performed over the entire search range (step S11). It should be noted that, at the time of determining whether or not the predetermined area Ei that has been shifted is within the search range, the search range determiner 33 may determine whether or not the corresponding virtual rectangular frame Bi in the three-dimensional space is within the search range. In a case where the predetermined area Ei that has been shifted is within the search range (Yes in step S11), the search range determiner 33 further determines whether or not the predetermined area Ei that has been shifted is within the range of the captured image G1 used in the previous search (step S12).

In a case where the predetermined area Ei that has been shifted is within the range of the captured image G1 (Yes in step S12), the search area image generator 31 sets (updates) the predetermined area Ei that has been shifted as a predetermined area Ei for generating the search area image Ci (step S3). Based on the updated predetermined area Ei, the search area image generator 31 generates (updates) the search area image Ci in the same manner as that described above. The search performer 32 searches for the entrance D1 in the updated search area image Ci. In this manner, while changing the search area image Ci by shifting the predetermined area Ei from the front side toward the back side in the direction of the aircraft axis AL, the search performer 32 repeatedly performs the search for the entrance D1 by using a plurality of search area images Ci, which are sequentially generated.

In a case where the predetermined area Ei that has been shifted is within the search range, but is not within the range of the captured image G1 (No in step S12), the search range determiner 33 transmits, to the controller 30, an instruction signal to change the image-capturing direction of the first camera 21. Based on the instruction signal, the controller 30 controls the image-capturing direction changing mechanism 34 corresponding to the first camera 21 to change the image-capturing direction of the first camera 21 (step S13). A change amount of the image-capturing direction is set such that the captured image before the image-capturing direction is changed and the captured image after the image-capturing direction is changed partly overlap each other.

In the example of FIG. 5, by rotating the cab 6 about the second rotational axis R6 by a predetermined angle θ, the image-capturing center axis L1 of the first camera 21 is changed into an image-capturing center axis L1a. The image-capturing center axis L1a crosses the reference axis VL of the virtual plane VP at a position that is shifted, toward the back side in the direction of the aircraft axis AL, from the position at which the image-capturing center axis L1 crosses the reference axis VL. It should be noted that, as previously described, a method adopted to change the image-capturing direction of each of the cameras 21 and 22 is not limited to this. For example, each of the cameras 21 and 22 itself may be rotated relative to the cab 6 about a predetermined rotational axis that extends in a direction crossing the horizontal plane.

The first camera 21 captures an image again after changing the image-capturing direction (step S2). Thereafter, the search process is performed in the same manner on the updated captured image (steps S3 to S8).

In a case where the predetermined area Ei that has been shifted is not within the search range (No in step S11), if the number of retries that have been done is less than a preset reference value (No in step S14), the search range determiner 33 increments the number of retries by 1, and starts over the search process again. That is, the angle of the first camera 21 is brought back to the initial angle and then the image capturing is performed, and the search is performed based on the captured image. When the number of retries that have been done has become the reference value or greater, the search performer 32 determines that the entrance D1 has not successfully been detected, and outputs a result indicative of failed search (step S15).

Figure 6:
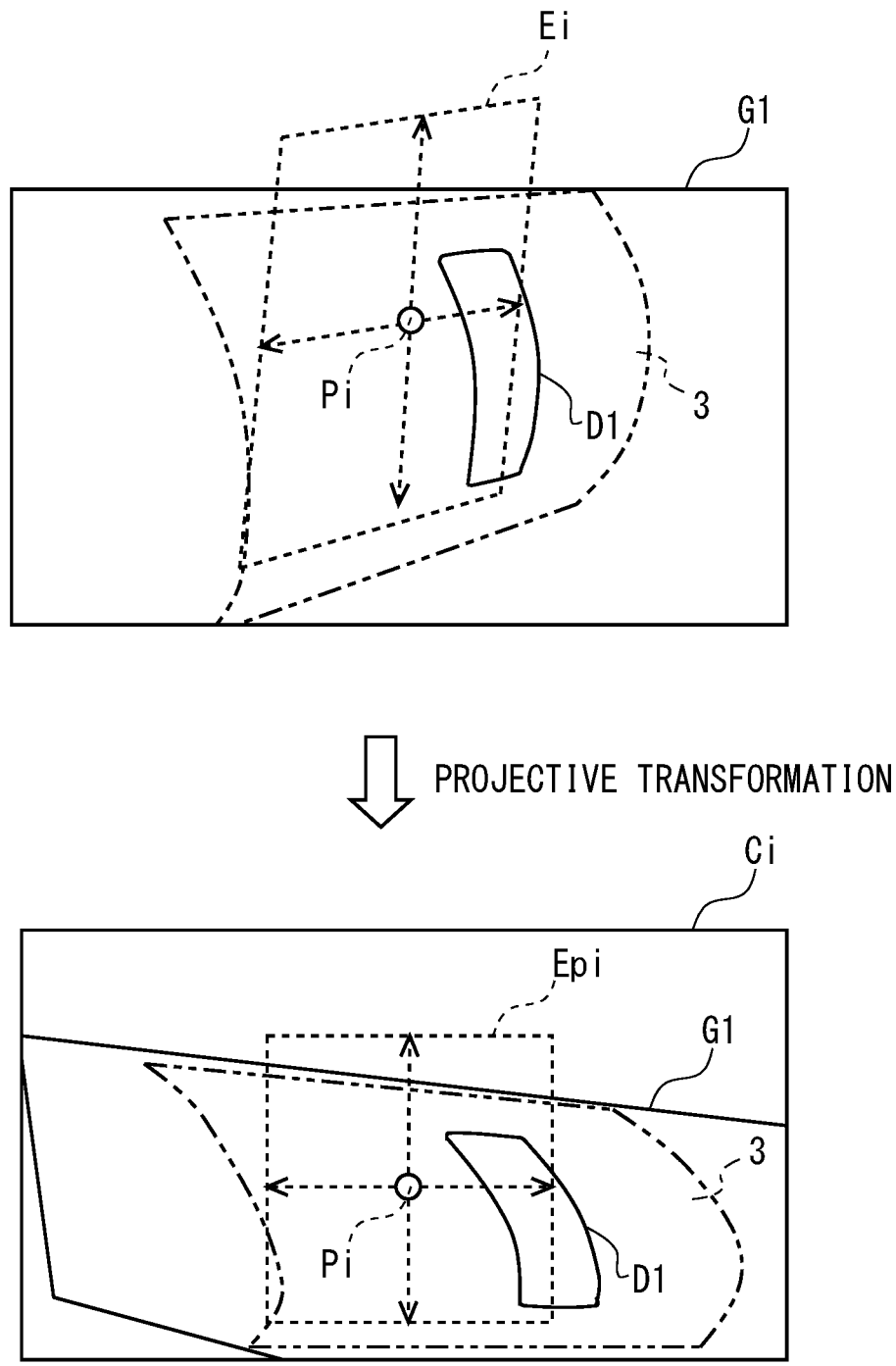
FIG. 6 shows a comparison, in the present embodiment, between an image in which projective transformation has been performed on the predetermined area and the image in which the projective transformation has not yet been performed on the predetermined area.

Hereinafter, the projective transformation is described in more detail. FIG. 6 shows a comparison, in the present embodiment, between an image in which the projective transformation has been performed on the predetermined area and the image in which the projective transformation has not yet been performed on the predetermined area. FIG. 6 illustratively shows a case where the virtual rectangular frame Bi is set near the entrance DL. In FIG. 6, a part of the outer surface of the aircraft 3 is indicated by two-dot chain line.

As mentioned above, it is often the case that the predetermined area Ei including a part of the captured image G1 is in a distorted quadrangular shape. In the search area image Ci, which is a projective-transformed image, the virtual rectangular frame Bi has the same rectangular shape as the shape set in the three-dimensional space. For example, if the virtual rectangular frame Bi has a square shape, then after the projective transformation, a predetermined area Epi corresponding to the virtual rectangular frame Bi also has a square shape. In accordance therewith, in the projective-transformed image, correction is made such that it is brought closer to an image in which a part of the aircraft 3 near the virtual plane VP is seen from a direction perpendicular to the aircraft axis AL of the aircraft 3. It should be noted that, to be exact, the correction is to be made only on a physical object that is present on the virtual plane VP. Therefore, the greater the distance from the virtual plane VP, the greater the correction error remaining.

In FIG. 6, the image-capturing direction (the image-capturing center axis L1) of the first camera 21 is inclined relative to the aircraft axis AL. Accordingly, the door included in the predetermined area Ei, which is the entrance D1, is shown in such a manner that the lower end portion and the upper end portion of the door are inclined relative to the horizontal line of the captured image G1. As previously mentioned, in the search for the entrance D1 (e.g., in the aforementioned AI image recognition), the reference point on the door is set, for example, on the door sill or on the reinforcing plate provided on the door sill. In this case, in the image used in the search for the entrance D1, preferably, the lower end portion (the door sill or the reinforcing plate) of the entrance D1 (the door) extends horizontally.

In the present embodiment, as shown in FIG. 6, the projective transformation is performed on the predetermined area Ei, which includes a part of the captured image G1, so that the virtual rectangular frame Bi, which is set on the virtual plane VP parallel to the aircraft axis AL and perpendicular to the horizontal plane (the apron EP), is displayed as a rectangle. Also, a change in the size of the entrance D1, the change depending on the distance between the first camera 21 and the entrance D1, is suppressed by the projective transformation. That is, regardless of the distance between the first camera 21 and the entrance D1, the size of the entrance D1 after the projective transformation can be made about constant in each projective-transformed image. This makes it possible to precisely detect the entrance D1 in the projective-transformed image.

As described above, according to the present embodiment, a plurality of search area images Ci are generated from the captured image Gj captured by each of the cameras 21 and 22, which are provided on the respective distal ends of the passenger boarding bridge 1 (i.e., the distal end of the first boarding bridge 11 and the distal end of the second boarding bridge 12). On each of the plurality of search area images Ci, the predetermined area Ei, which includes a part of the captured image Gj, is demarcated. Each of the plurality of search area images Ci is generated by shifting the predetermined area Ei from one side toward the other side of the aircraft 3 in the direction of the aircraft axis AL. Accordingly, the search for each of the entrances D1 and D2 is repeatedly performed while changing the search area image Ci by using the plurality of search area images Ci, which are sequentially generated. In this manner, the search for each of the entrances D1 and D2 can be performed over the entire captured image Gj while shifting the search area in a direction along the aircraft axis AL of the aircraft 3.

This makes it possible to perform the search for each of the entrances D1 and D2 in a uniform manner regardless of the type of the aircraft 3 or the gate arrangement. Therefore, precise detection of the position of each of the entrances D1 and D2 of the aircraft 3 can be performed for various gate arrangements. A conventional way of detection of the position of each of the entrances D1 and D2, which depends solely on three-dimensional positions, cannot achieve proper detection for a certain gate arrangement. However, even for such gate arrangement, the present embodiment makes it possible to perform proper detection of the entrances D1 and D2, with which the passenger boarding bridge 1 is to be docked. In addition, in the search for the entrances D1 and D2, onerous operations such as inputting information corresponding to the parked aircraft 3 can be made unnecessary. That is, merely by a button operation by an operator to start the search process, the search process and a below-described automatic docking control process can be performed for any of various types of aircrafts 3.

Further, according to the present embodiment, the search area image Ci is generated as an image parallel to the aircraft axis AL by projective transformation. Therefore, even in a case where the captured image Gj is an image captured from a diagonal direction relative to the aircraft 3, shape distortion of each of the entrances D1 and D2 to be searched for can be suppressed in the search area image Ci. This makes it possible to improve the precision of the search for each of the entrances D1 and D2 in the search area image Ci.

Further, according to the present embodiment, each time the search area image generator 31 demarcates the predetermined area Ei, which includes a part of the captured image Gj, the search area image generator 31 performs projective transformation on the captured image Gj in the predetermined area Ei. Thus, for each predetermined area Ei, the projective transformation is performed on the captured image Gj (which is enlarged concurrently). In this manner, a reduction in image resolution can be suppressed compared to a case where: the projective transformation is performed on the entire captured image Gj; and then from the resulting projective-transformed image, the predetermined area Ei is demarcated and enlarged.

Further, according to the present embodiment, in a case where it is determined that the predetermined area Ei that has been shifted is within the search range but is not within the captured image Gj, the image-capturing direction changing mechanism 34 or 35 changes the image-capturing direction of the camera 21 or 22, and the camera 21 or 22 captures an image again. Thus, by performing the image capturing multiple times while changing the image-capturing direction of the camera 21 or 22, a captured image of the entire search range can be obtained as a plurality of captured images Gj. Accordingly, an image-capturing range for each time of image capturing can be made relatively narrow, which makes it possible to increase the resolution of the search area image Ci obtained from the captured image Gj, or makes it possible to set the search range to be wider than the field of view of each of the cameras 21 and 22.

It should be noted that the above-described search process is also used in the search for the entrance D2 for the second boarding bridge 12 by using the second camera 22. For example, the connector 6a of the cab 6 of the first boarding bridge 11 is connected to the entrance D1 on the front side of the aircraft 3, and the connector 6a of the cab 6 of the second boarding bridge 12 is connected to the entrance D2 of the back side of the aircraft 3. In this case, in the search process to search for the entrance D1, to which the first boarding bridge 11 is to be connected, the search is performed from the front side toward the back side in the direction of the aircraft axis AL within a search range predefined for the first boarding bridge 11. That is, in the search process to search for the entrance D1, to which the first boarding bridge 11 is to be connected, as described above, the predetermined area Ei is, on the captured image G1, shifted from the front side toward the back side in the direction of the aircraft axis AL. Further, as necessary, the image-capturing direction of the first camera 21 is shifted from the front side of the aircraft 3 toward the back side thereof, and the image capturing is performed again.

On the other hand, in the search process to search for the entrance D2, to which the second boarding bridge 12 is to be connected, the search is performed from the back side toward the front side in the direction of the aircraft axis AL within a search range predefined for the second boarding bridge 12. That is, in the search process to search for the entrance D2, to which the second boarding bridge 12 is to be connected, the predetermined area Ei is, on the captured image G2, shifted from the back side toward the front side in the direction of the aircraft axis AL. Further, as necessary, the image-capturing direction of the second camera 22 is shifted from the back side of the aircraft 3 toward the front side thereof, and the image capturing is performed again.

In this manner, based on the captured image G1 captured by the first camera 21, the entrance D1, which is positioned on the front side of the aircraft 3, can be detected preferentially, and based on the captured image G2 captured by the second camera 22, the entrance D2, which is positioned on the back side of the aircraft 3, can be detected preferentially. This makes it possible to reduce the possibility of detecting the same entrance for the plurality of boarding bridges 11 and 12. Therefore, the entrance D1, to which the first boarding bridge 11 is to be connected, and the entrance D2, to which the second boarding bridge 12 is to be connected, can be precisely searched out within a short period of time.

Figure 7:
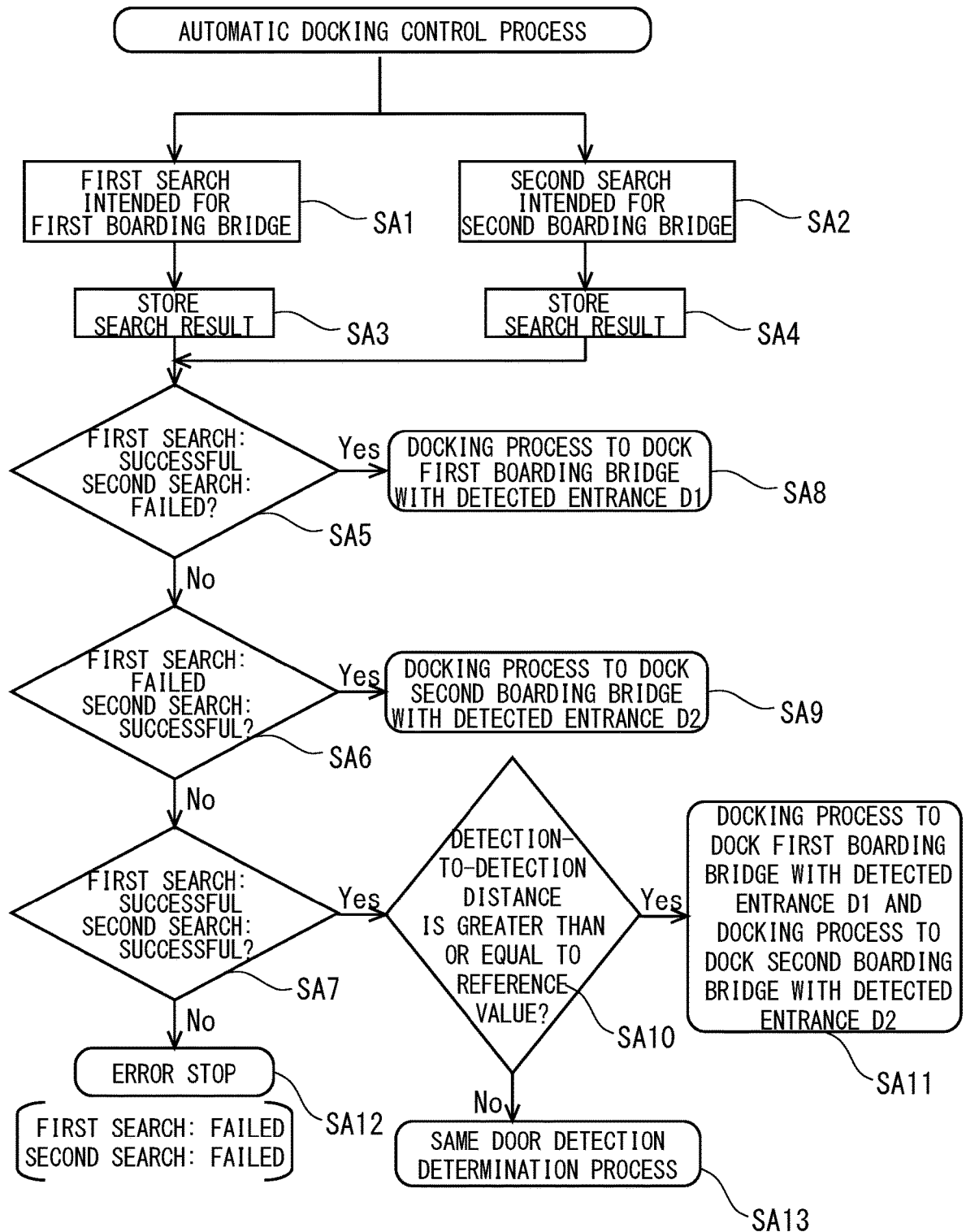
FIG. 7 is a flowchart showing a flow of one example of an automatic docking control process in the present embodiment.

Hereinafter, an automatic docking control process of docking the two boarding bridges 11 and 12 with the respective entrances D1 and D2 by using the search process according to the present embodiment is illustratively described. FIG. 7 is a flowchart showing a flow of one example of the automatic docking control process in the present embodiment. In the example of FIG. 7, the first search intended for the first boarding bridge 11 and using the first camera 21 (step SA1) and the second search intended for the second boarding bridge 12 and using the second camera 22 (step SA2) are performed in parallel. For example, an operator operates a predetermined operating device to press a start button to start concurrent docking, and thereby the first search and the second search are started concurrently. Alternatively, when a predetermined time has elapsed after the first search is started (and before the first search is ended), the second search may be started.

The predetermined operating device is provided in the first boarding bridge 11, the second boarding bridge 12, or in a control room of the terminal building 2 or the like. The operating device may be realized by displaying a virtual operating button on a touch panel of a communication terminal that is communicably connected to the controller 30 via a server.

When the first search is ended, the search performer 32 stores a result of the search (i.e., a result indicative of successful search in step S9 of FIG. 3, or a result indicative of failed search in step S15 of FIG. 3) in the storage 24 (step SA3). Similarly, when the second search is ended, the search performer 32 stores a result of the search in the storage 24 (step SA4). The search performer 32 determines whether or not to perform automatic docking of each of the boarding bridges 11 and 12 with the corresponding entrance D1 or D2 in accordance with a combination of the search results of the first search and the second search (step SA5 to step SA7).

In a case where the first search has been successful but the second search has failed (Yes in step SA5), the search performer 32 transmits three-dimensional position data of the entrance D1 detected by the first search to the controller 30, and gives the controller 30 a permission to perform automatic docking for the first boarding bridge 11. In response, the controller 30 performs a docking process to dock the first boarding bridge 11 with the entrance D1 detected by the first search (step SA8). Specifically, the controller 30 controls the drive column 7 of the first boarding bridge 11 and the cab 6, such that the position of the connector 6a of the cab 6 of the first boarding bridge 11 reaches a pre-position (a temporary stop position) that is calculated from the three-dimensional position of the detected entrance D1. After the connector 6a has reached the pre-position, the controller 30 detects the entrance D1 again by using, for example, the first camera 21 or a sensor provided on the connector 6a or the like, and performs control to connect the connector 6a to the entrance D1.

In a case where the first search has failed but the second search has been successful (Yes in step SA6), the search performer 32 transmits three-dimensional position data of the entrance D2 detected by the second search to the controller 30, and gives the controller 30 a permission to perform automatic docking for the second boarding bridge 12. The controller 30 performs a docking process to dock the second boarding bridge 12 with the entrance D2 detected by the second search (step SA9). The specific docking process is the same as the docking process of the first boarding bridge 11.

In a case where both the first search and the second search have been successful (Yes in step SA7), the search performer 32 determines whether or not the distance between the three-dimensional position of the entrance D1 (first position)

detected by the first search and the three-dimensional position of the entrance D2 (second position) detected by the second search (this distance is hereinafter referred to as "detection-to-detection distance L") is greater than or equal to a predetermined reference value Lo (step SA10). In a case where the detection-to-detection distance L is greater than or equal to the reference value Lo (Yes in step SA10), the search performer 32 determines that the entrance D1 detected by the first search and the entrance D2 detected by the second search are different entrances from each other, transmits three-dimensional position data of each of the entrances D1 and D2 to the controller 30, and gives the controller 30 a permission to perform automatic docking for both the first boarding bridge 11 and the second boarding bridge 12. The controller 30 performs a docking process to dock the first boarding bridge 11 with the entrance D1 detected by the first search, and performs a docking process to dock the second boarding bridge 12 with the entrance D2 detected by the second search (step SA11).

On the other hand, in a case where both the first search and the second search have failed (No in step SA7), the search performer 32 outputs an error to, for example, a display of the operating device, and stops the automatic docking control process (step SA12).

In a case where both the first search and the second search have been successful and the detection-to-detection distance L is less than the reference value Lo (No in step SA10), the search performer 32 performs a same door detection determination process (step SA13). The same door detection determination process is a process to determine whether or not the entrance D1 detected by the first search and the entrance D2 detected by the second search are the same entrance. The reference value Lo is set based on the distance between the two doors of the aircraft 3. For example, the reference value Lo is set to ½ of the minimum door-to-door distance among all types of aircrafts. Therefore, in a case where the detection-to-detection distance L is less than the reference value Lo, it is likely that the entrance D1 detected by the first search and the entrance D2 detected by the second search are the same door.

Figure 8:
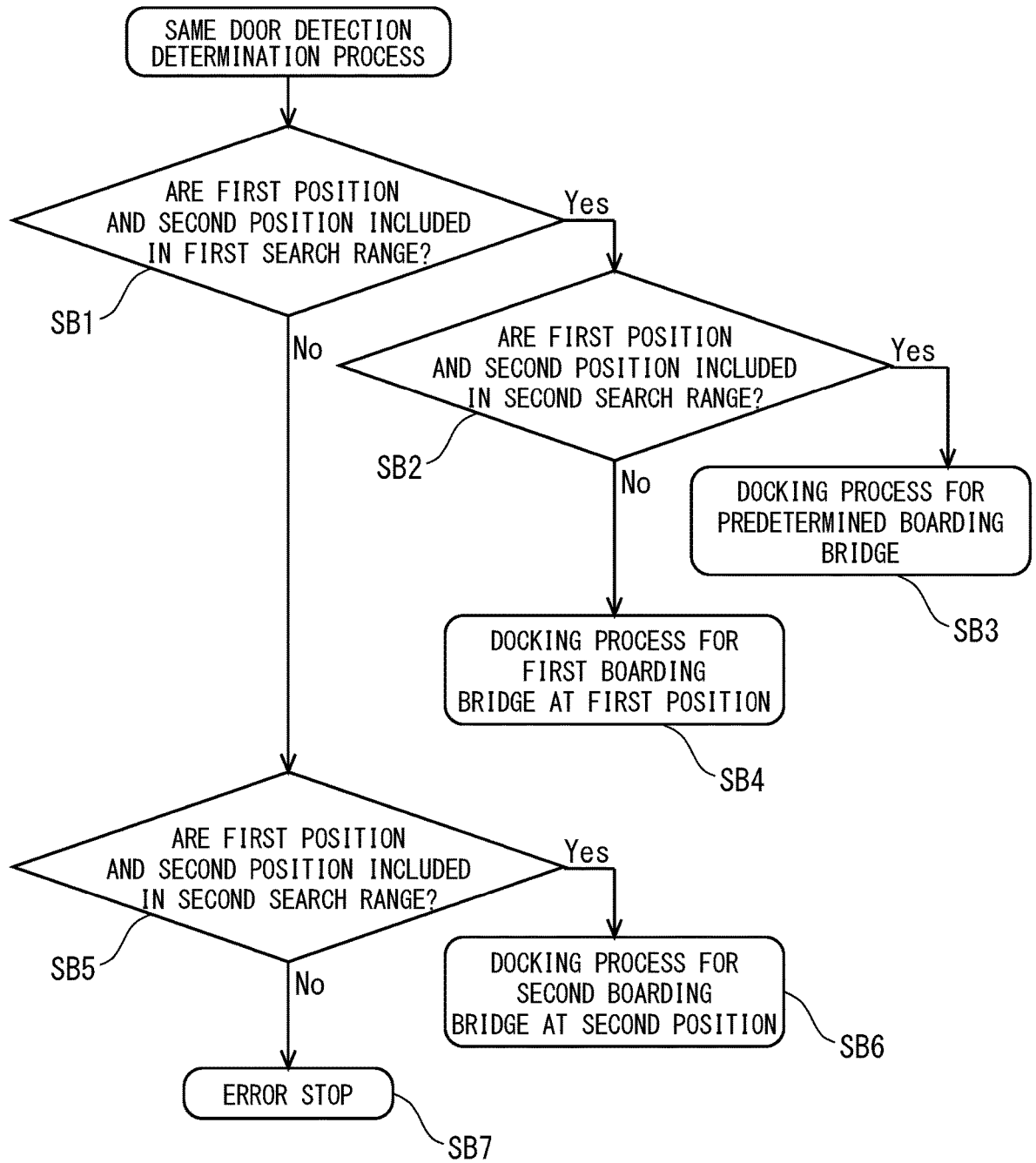
FIG. 8 is a flowchart showing a flow of a same door detection determination process of FIG. 7.
Figure 9:
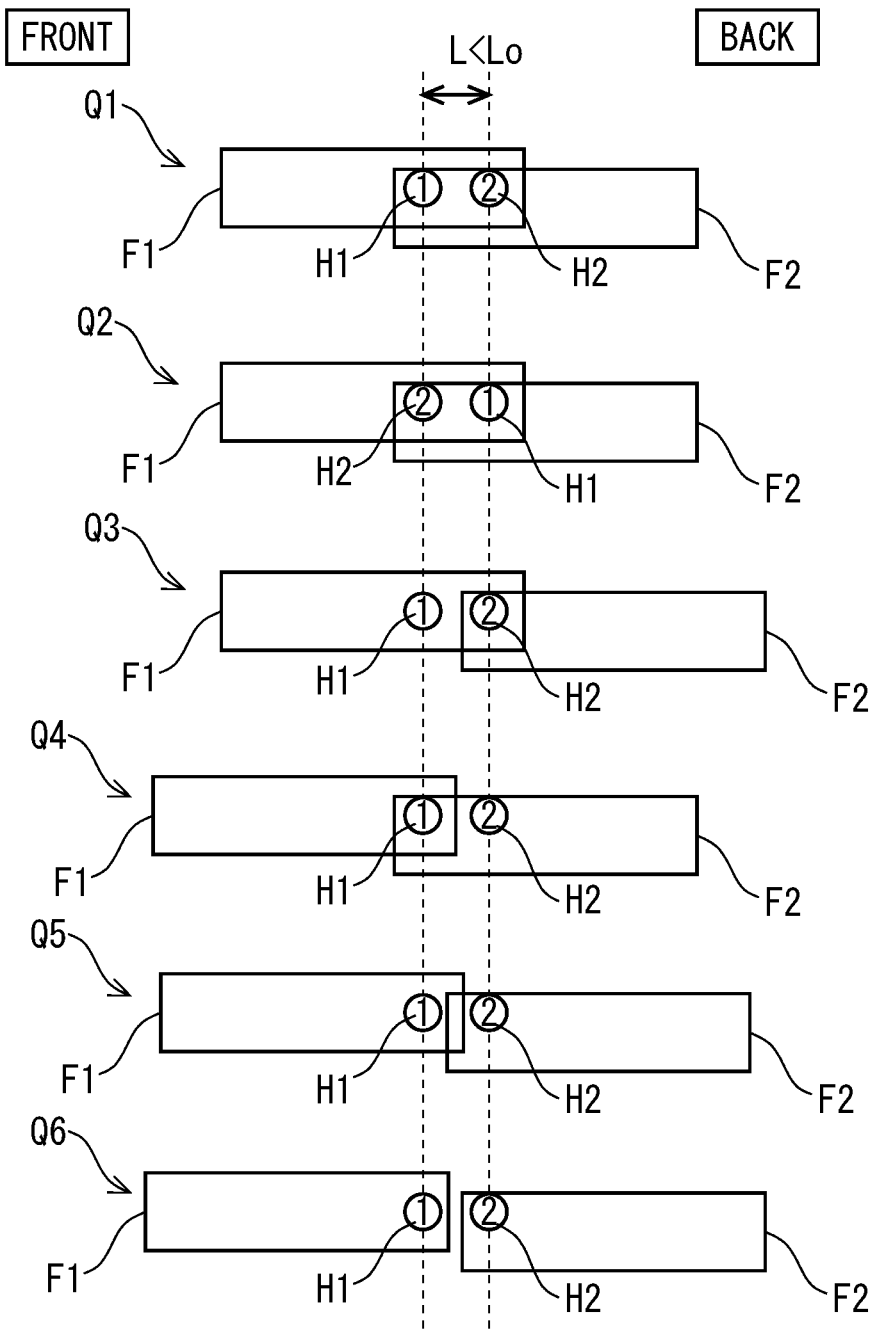
FIG. 9 is a conceptual diagram illustrating division into cases in the same door detection determination process.

FIG. 8 is a flowchart showing a flow of the same door detection determination process of FIG. 7. FIG. 9 is a conceptual diagram illustrating division into cases in the same door detection determination process. In the same door detection determination process, if a first position H1, which is the three-dimensional position of the entrance D1 detected by the first search, and a second position H2, which is the three-dimensional position of the entrance D2 detected by the second search, are both included in at least one of a first search range F1 set for the first camera 21 or a second search range F2 set for the second camera 22, then the search performer 32 determines that one entrance D1 or D2 has been detected at the first position H1 or the second position H2. In FIG. 9, the first search range F1 and the second search range F2 are shown in such a manner that their positions are shifted vertically from each other so that the first search range F1 and the second search range F2 are readily distinguishable from each other. It should be noted that the vertical position of the first search range F1 and the vertical position of the second search range F2 may be the same, or may be different from each other.

More specifically, the search performer 32 determines whether or not both the first position H1 and the second position H2 are included in the first search range F1 (step SB1). In a case where both the first position H1 and the second position H2 are included in the first search range F1 (Yes in step SB1), the search performer 32 determines that the detection of the entrance D1 by the first search is reliable, and determines the first position H1, which is the three-dimensional position of the entrance D1, to be valid. In this case, the search performer 32 further determines whether or not both the first position H1 and the second position H2 are included in the second search range F2 (step SB2).

In a case where both the first position H1 and the second position H2 are included in the second search range F2 (Yes in step SB2), the search performer 32 determines that the detection of the entrance D2 by the second search is also reliable, and determines the second position H2, which is the three-dimensional position of the entrance D2, to be valid. That is, the search performer 32 determines that both the first position H1 and the second position H2 are valid. This case corresponds to each of a state Q1 and a state Q2 in FIG. 9. The state Q1 is a case where the first position H1 is located on the front side in the direction of the aircraft axis AL, and the second position H2 is located on the back side in the direction of the aircraft axis AL. The state Q2 is a case where the first position H1 is located on the back side in the direction of the aircraft axis AL, and the second position H2 is located on the front side in the direction of the aircraft axis AL. In the state Q1 and also in the state Q2, both the first position H1 and the second position H2 are included in each of the search ranges F1 and F2.

In this case, the controller 30 moves a predetermined one of the first boarding bridge 11 or the second boarding bridge 12 to predetermined position coordinates of one of the first position H1 or the second position H2, and then performs a docking process for the predetermined one boarding bridge 11 or 12 (step SB3). For example, in a case where the first boarding bridge 11 is prioritized, the controller 30 may move the first boarding bridge 11 to the first position H1, and then perform the docking process for the first boarding bridge 11. Alternatively, in a case where the first boarding bridge 11 is prioritized, the controller 30 may move the first boarding bridge 11 to one of the first position H1 or the second position H2, the one position being located on the front side in the direction of the aircraft axis AL, and then perform the docking process for the first boarding bridge 11. As another example, in the case of the state Q1, the controller 30 may move the first boarding bridge 11 to the first position H1, whereas in the case of the state Q2, the controller 30 may move the first boarding bridge 11 to the second position H2.

In a case where it is determined that both the first position H1 and the second position H2 are included in the first search range F1, but the first position H1 is not included in the second search range F2 (No in step SB2), the search performer 32 determines that not both the detections of the entrances D1 and D2, but only the detection of the entrance D1 by the first search is reliable, and determines only the first position H1 to be valid. This case corresponds to a state Q3 in FIG. 9. In this case, the controller 30 moves the first boarding bridge 11 to the first position H1, and performs the docking process for the first boarding bridge 11 (step SB4).

In a case where it is determined that the second position H2 is not included in the first search range F1 (No in step SB1), the search performer 32 determines whether or not both the first position H1 and the second position H2 are included in the second search range F2 (step SB5). In a case where it is determined that the second position H2 is not included in the first search range F1, but both the first position H1 and the second position H2 are included in the second search range F2 (Yes in step SB5), the search performer 32 determines that not both the detections of the entrances D1 and D2, but only the detection of the entrance D2 by the second search is reliable, and determines only the second position H2 to be valid. This case corresponds to a state Q4 in FIG. 9. In this case, the controller 30 moves the second boarding bridge 12 to the second position H2, and performs the docking process for the second boarding bridge 12 (step SB6).

In a case where it is determined that the second position H2 is not included in the first search range F1 and the first position H1 is not included in the second search range F2 (No in step SB5), the search performer 32 determines that both the detection of the entrance D1 and the detection of the entrance D2 are not reliable, and determines the first position H1 and the second position H2 to be invalid. This case corresponds to each of a state Q5 and a state Q6 in FIG. 9. The state Q5 is a case where the first search range F1 and the second search range F2 partly overlap each other, but there is no search range in which both the first position H1 and the second position H2 are included. The state Q6 is a case where the first search range F1 and the second search range F2 do not overlap each other. In this case, the search performer 32 outputs an error to, for example, the display of the operating device, and stops the automatic docking control process (step SB7).

As described above, according to the above configuration, the search for the entrance D1, to which the first boarding bridge 11 is to be connected, and the search for the entrance D2, to which the second boarding bridge 12 is to be connected, are concurrently performed in parallel, which makes it possible to shorten the search period. Further, in a case where the distance between the first position H1 detected by the first search and the second position H2 detected by the second search is short, if both the first position H1 and the second position H2 are included in at least one of the first search range F1 or the second search range F2, then it is determined that one entrance has been detected by the two searches. Thus, even in a case where the first position H1 and the second position H2 are close to each other, only in a case where the detection of one entrance by two searches is assumed to be reliable, a determination that one entrance has been detected is made, which makes it possible to suppress the occurrence of erroneous detection.

[Variations]

Although the embodiment of the present disclosure has been described above, the present disclosure is not limited to the above embodiment, and various improvements, alterations, and modifications can be made to the above embodiment without departing from the scope of the present disclosure.

For example, in the above-described embodiment, the cameras 21 and 22, by each of which the captured image Gj for generating the search area image Ci is captured, are cameras each provided on the upper part of the cab 6. Alternatively, the search area image Ci may be generated from the captured image Gj that is captured by a camera provided on the lower part of the cab 6. Further, a search process may be performed by using a plurality of captured images Gj captured by a plurality of cameras that are provided on the upper part and the lower part, respectively, of one cab 6.

The above embodiment has described the case where the passenger boarding bridge 1 includes two boarding bridges 11 and 12. Alternatively, the passenger boarding bridge 1 may be a single boarding bridge, or may include three or more boarding bridges. For example, also in a case where the passenger boarding bridge 1 includes three boarding bridges and the aircraft 3 has first and second decks and entrances that are positioned on the first and second decks, the detection system 20 of the present disclosure is applicable to all of the three boarding bridges.

In this case, for example, in order to connect the first boarding bridge to the entrance D1, which is a first deck entrance positioned on the front side in the direction of the aircraft axis AL, the first search is performed from the front side toward the back side in the direction of the aircraft axis AL within the first search range. Also, in order to connect the second boarding bridge to the entrance D2, which is another first deck entrance but positioned on the back side in the direction of the aircraft axis AL, the second search is performed from the back side toward the front side in the direction of the aircraft axis AL within the second search range. Further, in order to connect a third boarding bridge to an entrance D3, which is a second-deck entrance, a third search is performed from the front side toward the back side in the direction of the aircraft axis AL within a third search range that is set at a higher elevation than the first search range for the first search.

The above embodiment has illustratively described the mode in which the search intended for the second boarding bridge 12 is performed from the back side toward the front side in the direction of the aircraft axis AL within the second search range F2. Alternatively, similar to the search intended for the first boarding bridge 11, the search intended for the second boarding bridge 12 may be made performable from the front side toward the back side in the direction of the aircraft axis AL.

For example, in an aircraft parking area as shown in FIG. 1 where one boarding gate is equipped with two boarding bridges 11 and 12, an aircraft 3 with only one entrance may be parked. In this case, if the automatic docking control process is performed in such a mode as illustratively described in the above embodiment, a search process is performed for each of the boarding bridges 11 and 12, and then a docking process is performed for either one of the boarding bridge 11 or the boarding bridge 12 (any of steps SA8, SA9, SB3, SB4, and SB6). Here, an operator may select the number of boarding bridges to be docked with the parked aircraft 3 in accordance with the type of the parked aircraft 3. In a case where the number of boarding bridges to be docked with the aircraft 3 is two, the image processor 23 performs a search process to dock the first boarding bridge 11 with the entrance D1 and to dock the second boarding bridge 12 with the entrance D2 in such a mode as illustratively described in the above embodiment. On the other hand, in a case where the number of boarding bridges to be docked with the aircraft 3 is one, which one of the first boarding bridge 11 or the second boarding bridge 12 is to be docked with the aircraft 3 may be selected in accordance with, for example, the parking position of the aircraft 3.

In a case where the first boarding bridge 11 is selected as a boarding bridge to be docked with the entrance D1 of the aircraft 3, similar to the above-described embodiment, the image processor 23 performs a search process to do the search from the front side toward the back side in the direction of the aircraft axis AL within the first search range F1. On the other hand, in a case where the second boarding bridge 12 is selected as a boarding bridge to be docked with the entrance D1 of the aircraft 3, the image processor 23 may perform a search process to do the search from the front side toward the back side in the direction of the aircraft axis AL within the second search range F2.

Also, for example, in a case where the distance between the front-side entrance D1 and the back-side entrance D2 of the aircraft 3 is great, or in a case where the first search range F1 and the second search range F2 do not overlap each other, but are away from each other in the direction of the aircraft axis AL, both the first search intended for the first boarding bridge 11 and the second search intended for the second boarding bridge 12 may be performed in the same direction (i.e., from one side toward the other side in the direction of the aircraft axis AL).

The search direction in the second search may be automatically selected in accordance with switching between the above-described connection modes (i.e., the connection mode in which the second boarding bridge 12 is connected to the back-side entrance D2 of the aircraft 3 having the two entrances D1 and D2, and the connection mode in which the second boarding bridge 12 is connected to the entrance D1 of the aircraft 3 having only one entrance D1), or the search direction may be manually selected by operating the operating device. Further, the search direction in the first search may be made switchable, i.e., not limited to from the front side toward the back side in the direction of the aircraft axis AL, but may be from the back side toward the front side in the direction of the aircraft axis AL.

The above embodiment has illustratively described the mode in which the first search intended for the first boarding bridge 11 and the second search intended for the second boarding bridge 12 are performed in parallel in order to connect the two boarding bridges 11 and 12 to the two entrances D1 and D2, respectively. Alternatively, the first search and the second search may be performed in series. For example, the second search may be performed after the first search, or the first search may be performed after the second search.

The above embodiment has illustratively described the mode in which one image processor 23 performs both the first search and the second search. Alternatively, the image processor 23 to perform the first search and the image processor 23 to perform the second search may be realized by different processors (e.g., different computers), respectively. For example, an image processor to perform the first search may be installed in the first boarding bridge 11, and an image processor to perform the second search may be installed in the second boarding bridge 12.

The above embodiment has illustratively described the mode in which one controller 30 controls the operations of all of the following components: the first boarding bridge 11; the second boarding bridge 12; the image-capturing direction changing mechanism 34 for the first camera 21; and the image-capturing direction changing mechanism 35 for the second camera 22. Alternatively, some of these components 11, 12, 34, and 35 may be controlled by a different controller (s), or all of these components 11, 12, 34, and 35 may be controlled by respective controllers that are different from each other.

REFERENCE CHARACTERS LIST

1 passenger boarding bridge
2 terminal building
3 aircraft
11 first boarding bridge
12 second boarding bridge
20 detection system
21 first camera
22 second camera
23 image processor
30 controller
31 search area image generator
32 search performer
33 search range determiner
34, 35 image-capturing direction changing mechanism
D1, D2 entrance

The invention claimed is:

1. A detection system for detecting an entrance of an aircraft, the detection system comprising:
a passenger boarding bridge connected to a terminal building;
a camera provided on the passenger boarding bridge; and
an image processor that detects the entrance of the aircraft from a captured image captured by the camera, wherein
the image processor includes:
a search area image generator that generates a search area image by demarcating a predetermined area that includes a part of the captured image, and performs projective transformation on a virtual plane in the predetermined area of the captured image; and
a search performer that performs a search to determine whether or not the entrance is present within the search area image,
the search area image generator shifts the predetermined area on the captured image from one side toward the other side of the aircraft in a direction of an aircraft axis of the aircraft to sequentially generate the search area image, and
the search performer repeatedly performs the search while changing the search area image by using a plurality of the search area images that are sequentially generated.

2. The detection system according to claim 1, wherein
the search area image generator performs the projective transformation on the virtual plane in the captured image, the virtual plane being perpendicular to a horizontal plane and parallel to the aircraft axis, to transform the virtual plane into an image that is seen from a direction perpendicular to the virtual plane.

3. The detection system according to claim 2, wherein
each time the search area image generator demarcates the predetermined area, which includes a part of the captured image, the search area image generator performs the projective transformation on the captured image in the predetermined area.

4. The detection system according to claim 1, comprising:
an image-capturing direction changing mechanism that changes an image-capturing direction of the camera by rotating about a predetermined rotational axis that extends in a direction crossing the horizontal plane; and
a controller that controls an operation of the image-capturing direction changing mechanism, wherein
the image processor includes a search range determiner that determines whether or not the predetermined area that has been shifted is within a predefined search range and within the captured image, and
in a case where it is determined that the predetermined area that has been shifted is within the search range, but is not within the captured image, the controller causes the image-capturing direction changing mechanism to change the image-capturing direction of the camera, and causes the camera to capture an image again.

5. The detection system according to claim 1, wherein
the passenger boarding bridge includes a first boarding bridge and a second boarding bridge,
the camera includes a first camera provided on the first boarding bridge and a second camera provided on the second boarding bridge, and
the search area image generator shifts the predetermined area on the captured image captured by the first camera from a front side toward a back side of the aircraft in the direction of the aircraft axis to sequentially generate the search area image, and shifts the predetermined area on the captured image captured by the second camera from the back side toward the front side of the aircraft in the direction of the aircraft axis to sequentially generate the search area image.

6. The detection system according to claim 5, wherein the search performed by the search performer includes a first search and a second search, and the search performer performs the first search and the second search in parallel, the first search using the search area image that is generated from the captured image captured by the first camera, the second search using the search area image that is generated from the captured image captured by the second camera.

7. The detection system according to claim 5, wherein in a case where a distance between a first position and a second position, the first position being a position at which the entrance is detected by the first search using the search area image generated from the captured image captured by the first camera, the second position being a position at which the entrance is detected by the second search using the search area image generated from the captured image captured by the second camera, is less than a predetermined reference value, if both the first position and the second position are included in at least one of a first search range set for the first camera or a second search range set for the second camera, the search performer determines that the entrance has been detected at the first position or the second position.

* * * * *